United States Patent [19]
Saneyoshi

[11] Patent Number: 5,307,136
[45] Date of Patent: Apr. 26, 1994

[54] DISTANCE DETECTION SYSTEM FOR VEHICLES

[75] Inventor: Keiji Saneyoshi, Tokyo, Japan

[73] Assignee: Fuji Jukogyo Kabushiki Kaisha, Tokyo, Japan

[21] Appl. No.: 960,688

[22] Filed: Oct. 14, 1992

[30] Foreign Application Priority Data

Oct. 22, 1991 [JP] Japan .................................. 3-274315

[51] Int. Cl.⁵ ........................... G01C 3/00; B60T 7/16
[52] U.S. Cl. ........................................ 356/1; 180/167; 250/201.6; 348/140
[58] Field of Search ........................ 358/107; 354/402; 356/1; 250/201.6, 201.8; 364/456; 180/167

[56] References Cited

U.S. PATENT DOCUMENTS

| Re. 32,886 | 3/1989 | Stauffer | 250/201 |
|---|---|---|---|
| 3,684,374 | 8/1972 | Humphrey | 356/4 |
| 4,206,365 | 6/1980 | Leitz | 250/550 |
| 4,257,705 | 3/1981 | Hosoe et al. | 356/1 |
| 5,068,738 | 11/1991 | Miida | 358/227 |
| 5,146,228 | 9/1992 | Irani et al. | 342/64 |
| 5,161,886 | 11/1992 | De Jong et al. | 364/449 |

FOREIGN PATENT DOCUMENTS

| 1490397 | 11/1977 | United Kingdom . |
|---|---|---|
| 0121411A | 10/1984 | European Pat. Off. . |
| WO88/00328 | 1/1988 | PCT Int'l Appl. . |
| 2148648A | 5/1985 | United Kingdom . |

Primary Examiner—Stephen C. Buczinski
Attorney, Agent, or Firm—Beveridge, DeGrandi, Weilacher & Young

[57] ABSTRACT

An automobile distance detection system includes an image camera system which photographs an object which exists in a required range external to an automobile, from a plurality of different directions and obtains a plurality of pictures, and a picture processing unit which processes the plural number of pictures photographed by the camera system and outputs a distance distribution for an entire picture. The image processing unit includes a coincidence calculation element which performs high-speed calculation of a degree of coincidence for each required region, and corresponding to the plural number of pictures photographed by the camera system, and a discrepancy amount determination element determines discrepancy amounts corresponding to the plural number of pictures on the basis of a minimum value for the coincidence, as information relating to the distance distribution.

22 Claims, 9 Drawing Sheets

DISTANCE DETECTION SYSTEM FOR VEHICLES

BACKGROUND OF THE INVENTION

The present invention relates to a distance detection system for a vehicle, which images an object in a predetermined range and detects a distance in dependency on an imaged picture.

The vehicle such as an automobile is so convenient for transporting persons or articles that vehicles are used in our modern society. Accordingly, many systems for automatically avoiding accidents have been developed recently.

For automatically avoiding collision between the vehicles and the objects, it is very important to detect an obstruct on a running way of the vehicle. Such a system has already been developed as detecting the obstacle by using a radar (radiation detecting and ranging), an ultrasonic wave, or a laser (light amplification by stimulated emission of radiation).

However, it is a very complicated and difficult work to recognize a running route in real time, to detect the obstacle on the route, and to measure a distance and velocity to the obstacle. In particular, the above-mentioned system can detect only the object in a fixed direction by using the radar, the ultrasonic wave and the laser.

Furthermore, it is necessary to detect a place of the obstacle on the road. However, such an apparatus as mentioned above cannot have the sufficient information. Furthermore, it is necessary to detect the obstacle in a large area along the road having curves, and it is insufficient to detect the obstacle only in the fixed direction in the manner of the above-mentioned apparatus.

Accordingly, a distance measurement system is recently used as an effective method. The system images a sight as an object by a camera mounted on the vehicle to take pictures, and processes the pictures so as to obtain a distance between the vehicle and the object.

The distance measurement systems using the picture are divided into two techniques. One is to estimate the distance to the object by measuring a relative distance between a camera position and an image by a single camera. The other is to obtain the distance to the object by a principle of a triangulation after a plurality of pictures are imaged by a plurality of cameras or one camera which has several positions sequentially changed.

The technique for imaging a sight by the single camera is advantageous because little data are processed. And manufacturing cost is low because the object having various characteristics is extracted from two-dimensional images and the characteristics are shown in a manner that a white line indicates the plane.

For example, Japanese patent application laid-open No. 1-242916 (1989) discloses the technique which a television camera is mounted in a cabin near a center portion at a top of a front window, the obstacle and the white line on the road are detected in dependency on a luminance distribution pattern on a certain survey line in the image and the two-dimensional luminant distribution pattern, and the three-dimensional position of the white line and the obstacle is estimated in dependency on parameters of a directional and visual field.

However, an actual picture on the road have various objects such as buildings and trees in surroundings, so that it is difficult to precisely detect the various objects such as a running car in front, an oncoming car, a pedestrian, a pole for a telephone or electric light, a white line across a road, and the like, from such a two-dimensional picture. Furthermore, there is the problem that an estimation of the three-dimensional position has a large error when the three-dimensional position of a white line and the obstacle is estimated from a parameter of the television camera where the surface of the road is uneven and the vehicle is pitching.

Namely, a method of imaging by the single camera cannot always precisely extract the object from the two-dimensional picture because a plurality of various objects exist in the forward view while running. Furthermore, it makes the recognized result ambiguous because estimation of the position of the television camera is not always proper by such an inclined road as a slope.

On the other hand, the technique using triangulation and plurality of pictures can obtain a precise distance because a distance is obtained by a relative discrepancy of the position of the same object in left and right pictures.

For example, Japanese patent application laid-open No. 59-197816 (1984) discloses a method for calculating a three-dimensional position of an obstacle by using the principle of the triangulation in which two television camera are mounted on a front part of the vehicle, the obstacle is detected by a luminant distribution pattern of two dimension in dependency on respective images of each television camera, and so obtain the positional discrepancy on two pictures.

Furthermore, as disclosed in documents of the 22th Research and Lecture Meeting held by the Mechanical Engineering Institute on Oct. 20, 1989, two television cameras are attached to right and left front ends of the vehicle to image two pictures, each of the pictures is spatially differentiated to extract only a dark/light changing point, an image scanning of one of camera is delayed by a predetermined time to superpose on another picture, only a white line is extracted from the superposition of both pictures in dependency on the characteristics of the luminant distribution pattern included in the white line and width values of the pattern, and a distance between the vehicle and the extracted white line is calculated in dependency on the delayed time and the principle of the triangulation. The documents disclose the technology for calculating the three-dimensional position of the white line from short to long distance in the manner that such a processing is performed by continuously changing the delayed time.

Furthermore, as disclosed in Automobile Technology Magazine of Vol. 44, No. 4, 1990, pages 54–59, there is described a technology for calculating the three-dimensional position of the white line by the triangulation in the manner that two television cameras are mounted at right and left front ends of the vehicle, a white line is detected by the luminant distribution pattern in the two-dimensional window with respect to every picture of the television cameras, and the discrepancy of the white line on the two pictures of the right and left cameras.

The above prior art can prevent generation of large errors because two television cameras are used and the three-dimensional position is calculated by the triangulation. However, it is difficult for the above prior art to detect the white line and the obstacle as the object from the two-dimensional picture having various objects and background only by using the luminant distribution pattern. Therefore, even though the three-dimensional pictures have advantages in their use, the amount of the processing data is vast because matching between the right and left pictures must be repeated, thereby deteriorating processing speed.

In order to overcome the above deterioration, since a processing amount must be reduced and pre-processing must be performed, there must be generating binary data, detecting an edge, highly extracting the characteristic point and a set of the window with a decrease of information data. So that the distance must be measured only in the window or only for the object which can generate the binary data and the portion of the characteristic point such as edge or the like.

Accordingly, the prior art has the problem that the necessary object data are eliminated the data with respect to a pedestrian, an electric light or telephone pole, a white line and edges of the road because processing is done at high-speed. Therefore, resulting in the deterioration of the information data in the manner that only a specified portion is previously extracted from the picture and a distance of the only specified portion is obtained.

SUMMARY OF THE INVENTION

This invention is made under the above conditions, and has an object to provide a distance detection system for a vehicle capable of obtaining a distance distribution of an entire picture at high speed and without a decrease of the information amount.

The distance detection system according to the present invention comprises an imaging system for imaging a plurality of pictures of an object taken from different directions in a set area outside a vehicle, and picture processing means for processing the picture and for outputting a distance distribution of an entire picture. The picture processing means comprises a coincidence calculating portion for rapidly calculating a coincidence of every predetermined area corresponding to the plurality of the pictures, and a discrepancy amount determining portion for determining a discrepancy of corresponding picture element position in the picture in dependency on a minimum value of the coincidence.

A distance detecting system for a vehicle according to a first aspect of the present invention, comprises an imaging system for imaging a plurality of analog pictures of an object taken from different directions in a set area outside a vehicle, and picture processing means for processing the plurality of the analog pictures and for outputting a distance distribution for an entire picture. The picture processing means comprises a picture conversion portion for converting the plurality of the analog pictures into digital pictures having a predetermined luminant gradation, a coincidence calculating portion for rapidly calculating a coincidence of every predetermined area corresponding to the plurality of the analog pictures, a minimum/maximum value detecting portion for detecting a minimum value and a maximum value of the discrepancy, and a discrepancy amount determining portion for determining a discrepancy of corresponding picture element positions in the picture in dependency on the minimum value of the coincidence when the minimum value is on or under a first standard value, and when a difference between the maximum and minimum values is on or over a second standard value, and when a luminance change of a fine portion of a predetermined image in the digital image is on or over a third standard value, corresponding to the minimum value and maximum value of the coincidence.

A distance detecting system for a vehicle according to a second aspect of the present invention, comprises a picture memory mounted on the picture converting portion of the first aspect for storing the entire picture taken at low speed and a buffer memory mounted on the discrepancy calculating portion for storing a part of the picture.

A distance detecting system for a vehicle according to a third aspect of the present invention, comprises a data table mounted on the picture converting portion of the first aspect for compensating an output from the imaging system.

A distance detecting system for a vehicle according to a fourth aspect of the present invention, comprises the imaging system of the basic concept and the first aspect including two cameras for long distance and for short and two cameras and each having a solid-state imaging device.

The operation of the distance detecting system according to the present invention is as follows:

The system according to the basic concept of the present invention images a plurality of pictures of an object in a predetermined area outside a vehicle from different directions and calculates a coincidence at high speed for every area. The system determines a discrepancy amount corresponding to a picture element position, as data relevant to a distance distribution, in dependency on the minimum value of the coincidence.

The system according to the first aspect of this invention images a plurality of analog pictures of an object in a predetermined area outside the vehicle from different directions and converts the plurality of the analog pictures into digital pictures having a predetermined luminance gradation. And then the system calculates the coincidence of each predetermined region of the plurality of the digital pictures and detects the minimum and maximum values of the coincidence. The system determines a discrepancy amount corresponding to a pixel position, as data relevant to a distance distribution, in dependency on the minimum value of the coincidence, when the minimum value is on or under the first standard value, the difference between the maximum and minimum values is on or over the second standard value, and the luminant changing of the fine portion of the predetermined picture in the plurality of the digital pictures, in dependency on the minimum and maximum values of the coincidence which is previously detected.

Since the system according to the second aspect of the present invention has a memory in addition to the system according to the first aspect, the entire imaged pictures are stored in the picture memory which is mounted at the picture converting portion at a low speed. A part of the picture is stored in the buffer memory which is mounted at the coincidence calculating portion at a high speed.

The system according to the third aspect of the present invention compensates the output of the imaging system by using the table mounted in the picture converting portion.

The system according to the fourth aspect of the present invention images a plurality of the picture about an object in the predetermined area outside the vehicle in the different direction by means of two cameras for a long distance and two cameras for a short distance respectively having solid-state imaging elements.

As described above, since the system of the present invention can obtain a distance distribution over the entire picture in dependency on the picture without a decrease of data amount at a high speed, thereby detecting at the same time the three-dimensional positions with respect to the road ends and a white line and a solid object surrounding the vehicle by using the distance distribution, and resulting an effect to be able to realize a higher obstacle avoidance and to detect the position and movement of the obstacle.

DETAILED DESCRIPTION OF THE PREFERRED EMBODIMENT

Figure 2:
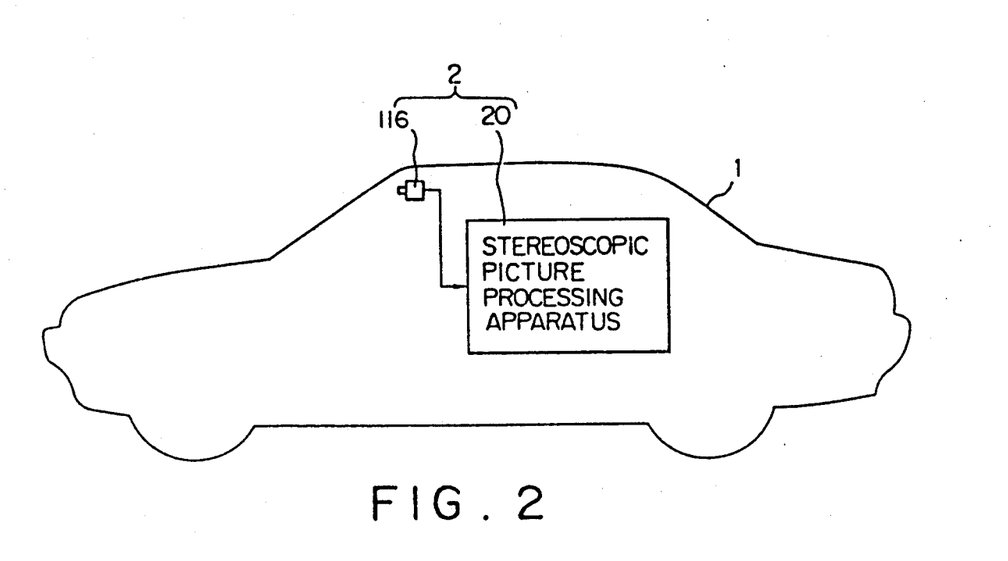
FIG. 2 is a side view of a vehicle showing an entire configuration of the distance detecting system.

In FIG. 2, numeral 1 shows a vehicle such as an automobile, and a distance detecting system 2 is mounted on the vehicle 1 in order to detect a distance by taking an optical image in a predetermined area outside the vehicle. The distance detecting system is connected to an apparatus for recognizing an obstacle on a road (not shown) to form an obstacle monitoring system which performs an operation such as a warning to a driver and an automatic collision avoidance of the vehicle.

The distance detecting system 2 comprises a stereoscopic optical system 10 as an imaging system for taking the optical image within a predetermined area outside the vehicle, and a stereoscopic picture processing apparatus 20 as picture processing means for processing a picture imaged by the optical system 10 to calculate the three-dimensional distance data. An apparatus for recognizing the obstacle on the road inputs the three-dimensional distance data which are calculated by the stereoscopic picture processing apparatus 20, thereby recognizing an obstacle for the vehicle 1 and the road shape.

Figure 3:
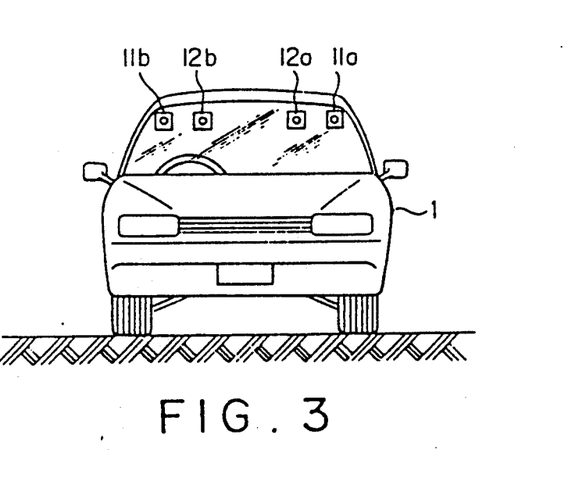
FIG. 3 is a front view showing the vehicle.

The stereoscopic optical system 10 is configured by a camera using a solid-state imaging element such as a charge coupled device (CCD). As shown in FIG. 3, the system 10 has two CCD cameras 11a and 11b (represented by 11 if necessary) for right and left angles of a long distance, and two CCD cameras 12a and 12b (represented by 12 if necessary) for right and left angles of a short distance. The cameras 12a and 12b are positioned inside the CCD cameras 11a and 11b for a long distance.

It is sufficient for the stereoscopic optical system 10 to actually measure the position from 2 to 100 meters in front of the vehicle 1 when the attached position of the CCD cameras 11 and 12 in the room of the vehicle 1 is 2 meters from the front top end of the hood, in a case where the distance measurement is performed within an area from the front end of the vehicle to the position of 100 meters ahead.

Figure 5:
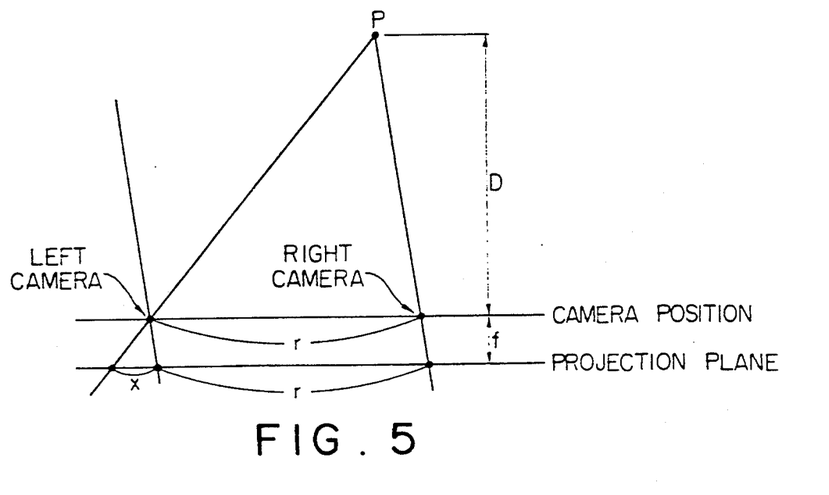
FIG. 5 is an explanatory view showing a relationship between a camera and an object.

Namely, as shown in FIG. 5, a picture of a point P is imaged on a plane of the projection distant from a focal position of each cameras by f in the case where an attached distance is r between the CCD cameras 11a and 11b for a long distance, the point P is distant from attached plane of the CCD cameras 11a and 11b by a distance D, and f denotes a focal point of the CCD camera 11a and 11b.

At this time, a distance is "r+x" from the position of the picture by the right CCD camera 11b to the position of the picture by the left camera 11a, and the distance D to the point P can be obtained in dependency on a discrepancy amount x by the following equation (1):

$$D = r.f/x \tag{1}$$

For example, distance distributions of a plurality of pixels for one object can be obtained in the case that a relative speed and a distance of static object distant from 100 meters when the vehicle 1 is running at 100 kilometers per hour. Therefore, even a highly accurate distance can be obtained by averaging the distance distributions, the discrepancy amount x must be changed at least for one pixel in the worst case of running distance 9 meters during 0.3 seconds.

Accordingly, a distance variation $\Delta D$ can be obtained by the following equation (2) led by the equation (1) when the discrepancy amount x is changed for $\Delta x$ at a distance D0:

$$\Delta D = -D0^2/(r.f).\Delta x \tag{2}$$

Figure 6:
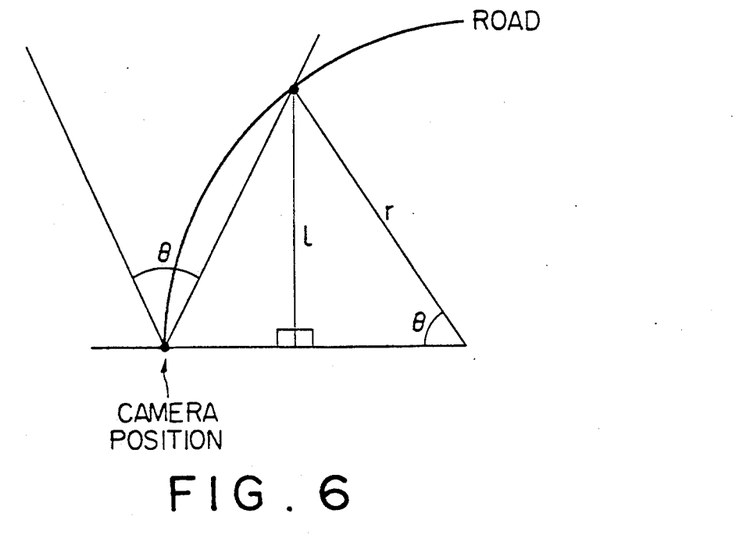
FIG. 6 is an explanatory view showing an angle of a visual field.

Here, a number of horizontal pixels is 727 when an effective area of the CCD of the cameras 11 and 12 is, for example, 8 mm (H)×6 mm (V) except a black region and a size of one pixel of CCD is 11 $\mu$m×13 $\mu$m. However, when a divided number of pixels in the horizontal direction is 512 because of the convenience for processing the pixels, a length of one pixel is "8 mm/512×1000=15.6" $\mu$m and "r.f=173" cm² when an "r.f" value is obtained by substituting these numbers for the equation (2). The focal length can be obtained in dependency on a necessary visibility angle $\theta$ and an actual distance measuring width of the CCD. The visibility angle $\theta$ is "$\theta=25$" degrees from "$\theta=\sin^{-1}(1/r)$" because of "r=230" and "l=100", as shown in FIG. 6, if the vehicle can obtain the optical image field for 100 meters ahead when the vehicle is running on the road of 230 meters of curvature radial which is the specific value of the "80 km/h" in a highway road, for example.

As described above, even though the effective width of the CCD is 8 mm, an actual width capable of measuring distance is the width that the width for searching the region is subtracted from the effective width. Therefore, the actual width is 6.3 mm in order to measure a distance when the searching width is 100 pixels, for example, under the general consideration of the visibility angle, the shortest detection distance and processing time.

Accordingly, the focal length f is "f=6.3 mm/(2.tan(25/2))=14.2" mm, and a lens of the focal length f=16 mm is adopted because it is easy to obtain and both values are near each other, thereby setting a distance r between two cameras to r=173 cm²/1.6 cm=108 cm.

As a result, the minimum measurement distance is obtained by the equation (1) to be D=173 cm²/(100×15.6 μm)=11.1, and even though 2 meters are measured, there is x=173 cm²/2m=8650 μm=554 pixels to therefore be over the width of one image plane.

Therefore, when r.f value is calculated by the equation (1) in the manner that the pictures imaged by two CCD cameras 12a and 12b for short distance has a discrepancy amount x of 100 pixels at 2 meters, there is r.f=100×15.6 μm=31.2 cm². When the CCD cameras 12a and 12b has the discrepancy of 10 pixels as the longest distance which can be measured, D=31.2 cm²/(10×15.6 μm)=20 meters.

Accordingly, the measurement area of the CCD cameras 11a and 11b for long distance and the CCD cameras 12a and 12b is overlapped from 11.1 meters to 20 meters, thereby measuring the distance from 2 to 100 meters by two pairs of the cameras for long and short distance.

Next, there is described a visibility angle in vertical direction. The vertical directional visibility of the camera for long distance is set between an angle of elevation $\alpha = \tan^{-1}(h_{up}-h_0/l_{min})=1.5$ degrees and an angle of depression $\beta = \tan^{-1}(h_0/l_{min})=6.2$ degrees on the horizontal road, as clarified from FIG. 7, when the height of the vision is at the point of 11.1 meters as the shortest measurement distance of the CCD cameras 11a and 11b and when an attached position $h_0$ of the CCD cameras 11a and 11b is 1.2 meters above the ground to have a vision of the height $h_{up}$ 1.5 meters above the ground.

Figure 7:
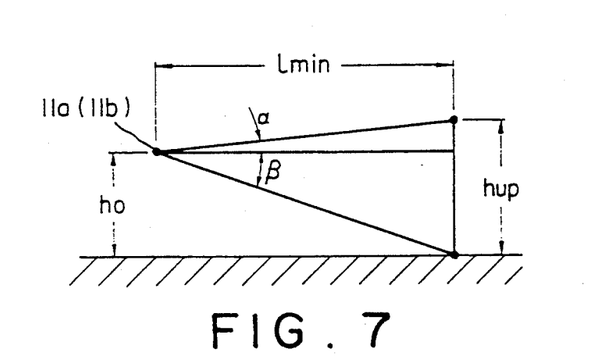
FIG. 7 is an explanatory view showing upper and lower angles of the visual field for a long distance.

A number of the pixels is obtained as 184 in the vertical direction of the image plane, because the focal length f of the CCD cameras 11a and 11b is 16 millimeters and a distance of the pixels is 13 μm in the vertical direction of the image plane and corrected to 200 pixels under the consideration of a pitching.

Figure 8:
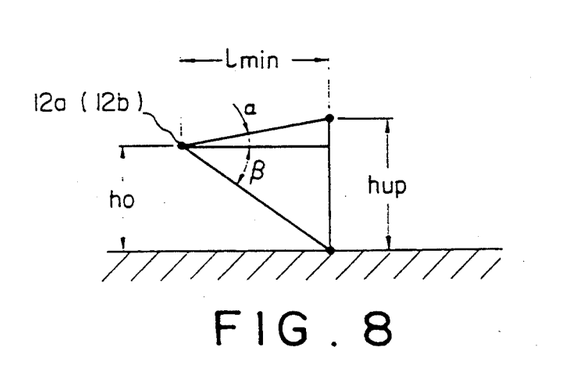
FIG. 8 is an explanatory view showing upper and lower angles of the visual field for a short distance.

In the same manner, the vertical visibility of the camera for short distance is an angle of elevation $\alpha = 8.5$ degrees and an angle of depression $\beta = 31$ degrees on the horizontal road, as clarified from FIG. 8, when the height of the vision is at the point of 2 meters as the shortest measurement distance of the CCD cameras 12a and 12b for short distance and when an attached position $h_0$ of the CCD cameras 12a and 12b is 1.2 meters above the ground to have a visibility of the height $h_{up}$ 1.5 meters above the ground.

In this case, when the vertical direction of the screen has 200 pixels same as the cameras for long distance for simplifying processing, the CCD cameras 12a and 12b for short distance respectively use a lens having a focal length under f=5.5 mm. But, when the cameras use a lens having a focal length f=6 mm because of easiness of obtaining and without a distortion, the height of an object is 1.42 meters to have a vision two meters before the lens. The visibility angle θ in the horizontal direction is 67 degrees and the distance r between two CCD cameras 12a and 12b is r=31.2 cm²/a 6 cm=52 cm.

In addition, when there is detection of the discrepancy amount x for the left and right pictures, it is necessary to find a picture of the same object in the left and right pictures, and with the present invention, in the stereoscopic picture processing apparatus 20 which is to be described later, the picture is divided into small regions, and the pattern of the brightness or the pattern of the color inside each of these small regions is compared for the left and right pictures and a region for which coincidence is found, and the distance distribution determined for across the entire image plane. Accordingly, it is possible to avoid decreasing of the amount of information due to the finding of portions for which these characteristics are in coincidence.

The coincidence of the left and right pictures can be evaluated by the city-block distance H shown by the following equation (3). In this equation, the brightness (or the color) of the i'th pixel of the left and right pictures is made Ai and Bi respectively. It is possible for the speed of calculation to be improved since there is no multiplication, and without a lowering of the amount of information due to the use of average values.

$$H = \Sigma |Ai - Bi| \qquad (3)$$

It can be seen from the above formula that as the number of pixels in one of the right and the left picture which agrees with a pixel at a corresponding position in one of another right or left picture becomes larger, then the city-block distance H becomes smaller; that is, the degree of coincidence becomes greater.

In addition, if the size of the small region is divided too large, then there becomes a higher possibility of distance objects mixed with close objects inside that region and the detected distance becomes vague. The region can be made smaller so as to obtain a distance distribution for the image but if it is too small, the amount of information is insufficient for investigation of the coincidence.

Because of this, for example, so that a vehicle having a width of 1.7 m and being at 100 meters ahead and the other vehicle on an adjacent lane do not enter a same region, the lateral width of the small region is made the maximum value and becomes four pixels based on this value with respect to the stereoscopic optical system 10. As the result of using this value as the basis for testing for the optimum number of pixels for an actual image, the width was made four pixels for both the lateral and longitudinal widths.

The description below is for an investigation of the coincidence of the left and right pictures when a picture is divided to small regions into 4 by 4 pixels, and the stereoscopic optical system 10 is represented by the CCD cameras 11a and 11b for long distance.

Figure 1:
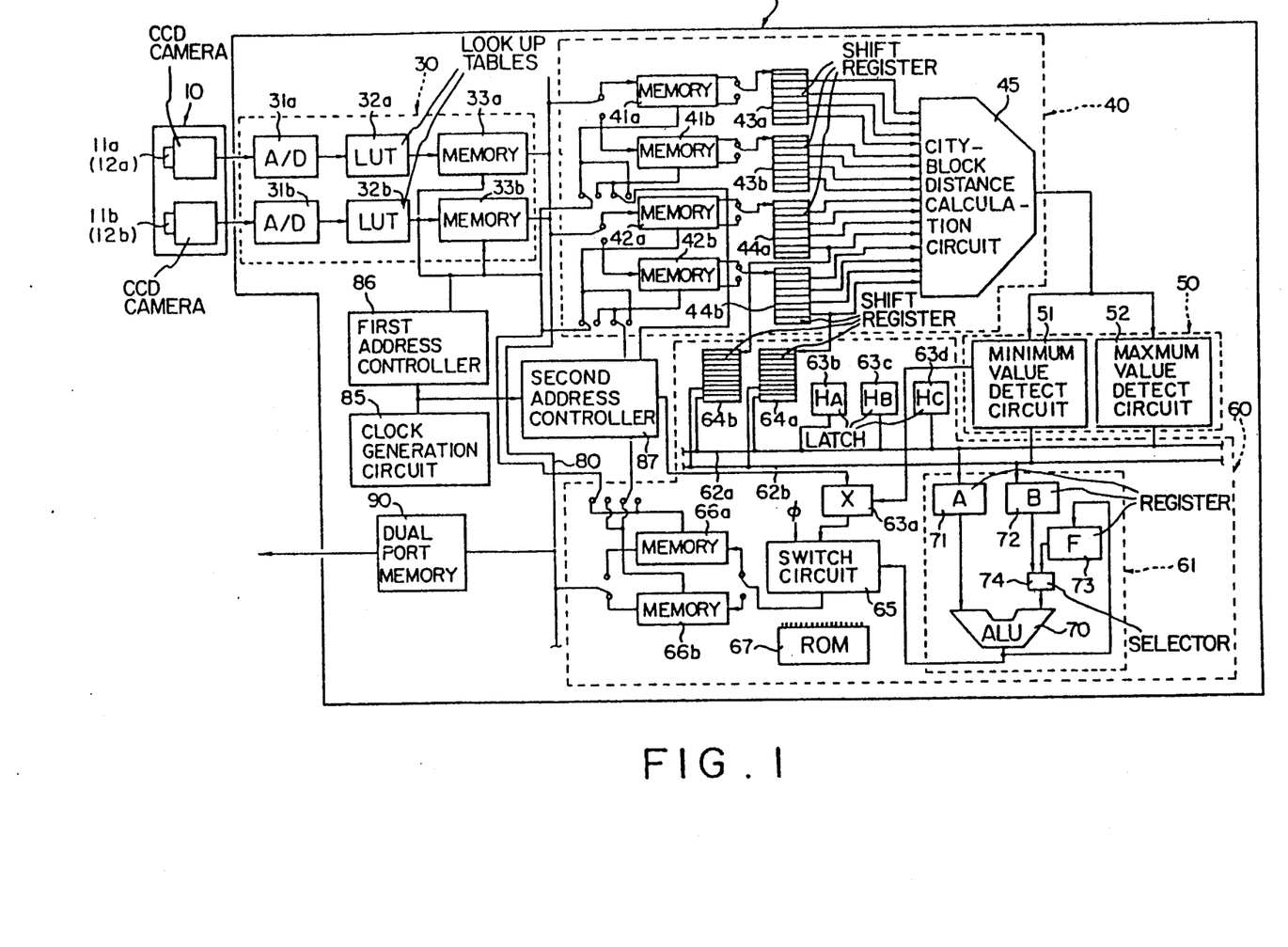
FIG. 1 is a circuit diagram showing a distance detecting system according to the present invention.

As shown in FIG. 1, the stereoscopic picture processing apparatus 20 is provided with a picture conversion section 30 which converts analog picture imaged by the stereoscopic optical system 10, into digital pictures, a city-block distance calculation section 40 as the coincidence calculation section which calculates the city-block distance H by shifting one pixel at a time and successively calculating the city-block distance H, a minimum/maximum value detection portion 50 which detects the minimum value $H_{MIN}$ and the maximum value $H_{MAX}$ for the city-block distance H, and a discrepancy determination section 60 which determines the discrepancy amount x by checking for whether or not the minimum value $H_{MIN}$ obtained by the minimum and maximum value detection section 50 is in coincidence for the left and right small regions.

In the image conversion section 30 described above, there are provided the A/D converters 31a and 31b corresponding with the CCD cameras 11a and 11b for the left and right optical images, and each of the A/D converters 31a and 31b are respectively connected to left and right picture memories 33a and 33b which store data representing the optical image which are taken by the CCD cameras 11a and 11b through the look-up tables (LUT) 32a and 32b which are data tables.

The A/D converters 31a and 31b have a brightness resolution of 8 bits for example, and the analog image data from the left and right CCD cameras 11a and 11b are converted into digital image data having a required brightness gradation. More specifically, the brightness of each pixel is converted to gray scale divided into 256 gradations, for example, because of when binarization of brightness of an image is performed, it can increase the speed of the processing, however, there is a large loss in the amount of information for the calculation of the coincidence of the left and right pictures.

In addition, the LUT 32a and 32b are configured on a read only memory (ROM). The LUT provide a data to correct a contrast of a picture converted into digital quantities by the A/D converters 31a and 31b having low brightness, and to correct differences in the characteristics of the left and right CCD camera 11a and 11b. Then, the signals which have been corrected by the LUT 32a and 32b are stored in the picture memories 33a and 33b.

As will be described later, the picture memories 33a and 33b perform processing to repeatedly take one portion of the image data in the city-block distance calculation section 40 and so it is possible for them to be configured with a relatively low-speed memory, and thus enable the cost to be reduced.

In the city-block calculation section 40, the pair of input buffer memories 41a and 41b are connected via the shared bus 80 to the left picture memory 33a, and the pair of input buffer memories 42a and 42b are connected via the shared bus 80 to the right picture memory 33b.

Each of the input buffer memories 41a and 41b for the left image data are connected to the two pairs of shift registers 43a and 43b which have an 8-stage configuration, and in the same manner, the two pairs of for example, 8-stage shift registers 44a and 44b are connected to each of the input buffer memories 42a and 42b for the left image data, and furthermore, the city-block distance calculation circuit 45 which calculates the city-block distance, is connected to the four pairs of shift registers 43a, 43b, 44a and 44b.

In addition, the two pairs of 10-stage shift registers 64a and 64b of the discrepancy determination section 60 are connected to the shift registers 44a and 44b for the right picture. When there is the start of data transfer for the next small region, the old data for which calculation of the city-block distance H has finished, is sent to the shift registers 64a and 64b and used when there is determination of the discrepancy amount x.

Figure 10:
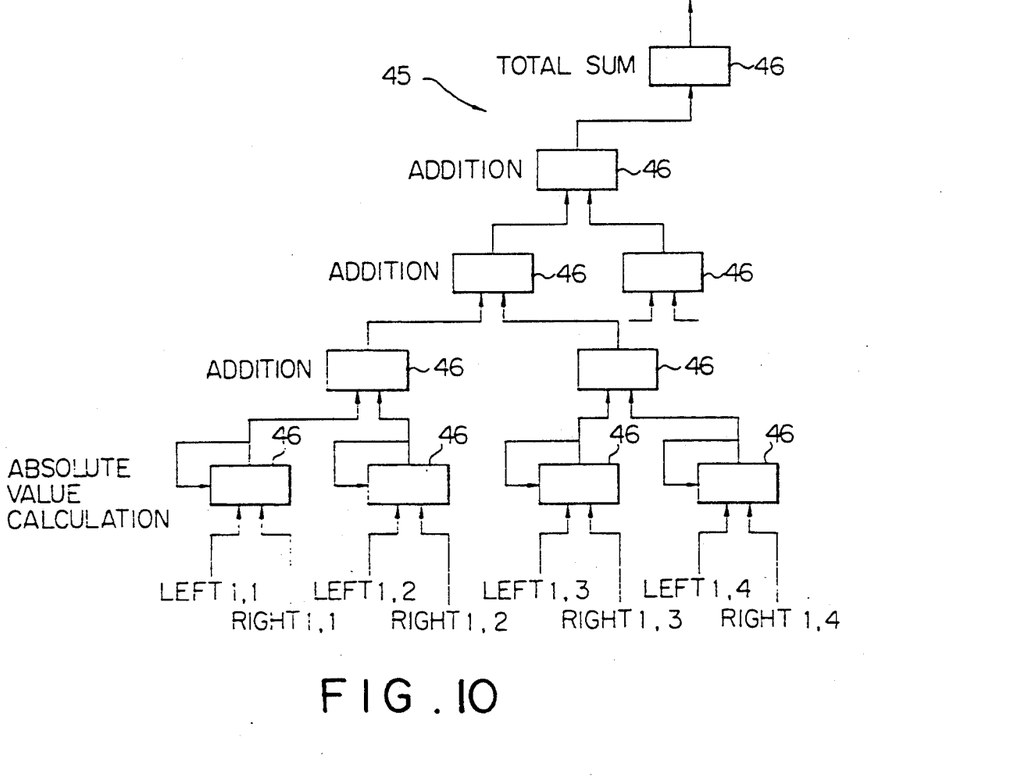
FIG. 10 is an explanatory view showing a city-block distance calculation circuit.

In addition, the city-block distance calculation circuit 45 comprises a plurality of single-block and high-speed CMOS type of calculator 46 each of which connects an input/output latch to an adder-subtracter as shown in detail in FIG. 10. The calculation circuit 45 has a pipeline structure having sixteen CMOS calculator connected as pyramids, and simultaneously calculates data of eight pixels. The first stage of this pyramid structure is an absolute value adder, and the second through fourth stages are a first adder, a second adder and a third adder respectively, while the final stage is a total sum adder.

FIG. 10 shows only half pair of the absolute value adder and the adder of the first and second stages.

In addition, each of the input buffer memories 41a, 41b, 42a and 42b are of the high-speed type with a relatively small capacity in accordance with the speed of city-block distance calculation, and the input and output are separated, while an address generated by a first address controller 86 is supplied to each of the buffer memories in accordance with the clock supplied from a clock generation circuit 85. In addition, transfer to and from the four pairs of shift registers 43a, 43b, 44a and 44b is controlled by a second address controller 87.

Moreover, when the calculation of the city-block distance H is performed by the software of a computer, it is necessary to have successive search of the small region in the image plane on the left with respect to one of the small regions of the image plane on the right, and for this to be performed for the entire small region portion of the right image plane, and when this calculation is performed in 0.08 seconds, for example, then a calculation performance of 500 MIPS (mega-instructions per second) is required if a program of five steps is used for each pixel. This performance is unable to be realized with a current type of microprocessor of the CISC type, and so a RISC processor, a digital signal processor (DSP) or a parallel processor has to be used.

The minimum and maximum value detection section 50 is provided with a minimum value detection circuit 51 which detects the minimum value $H_{MIN}$ for the city-block distance H and a maximum value detection circuit 52 which detects the maximum value $H_{MAX}$ for the city-block distance H, and the calculator 46 used by the city-block distance calculation circuit 45 is configured so as to use two for minimum and maximum value detection.

Figure 11:
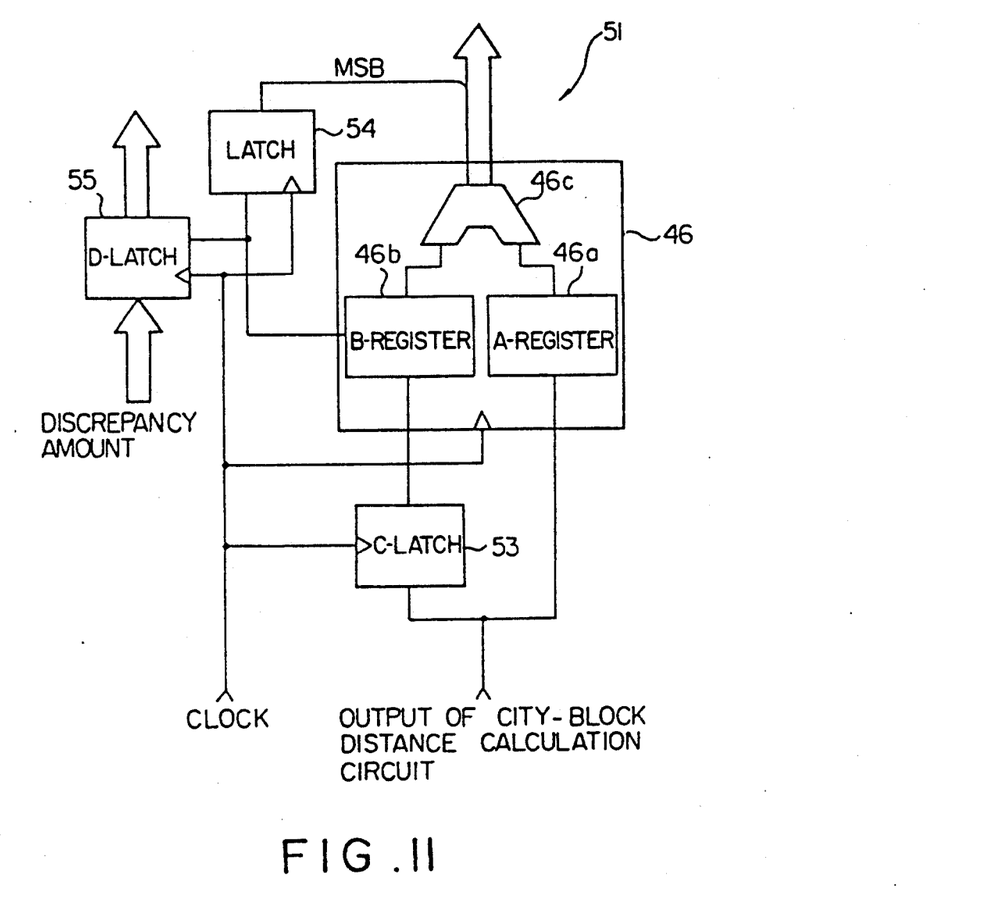
FIG. 11 is a block diagram showing a minimum value detection circuit.

As shown in FIG. 11, the minimum value detection circuit 51 comprises a calculator 46 having an A-register 46a, a B-register 46b and an arithmetic logic calculation unit (ALU) 46c, and which is connected to a C-latch 53, a latch 54 and a D-latch 55, and the output from the city-block distance calculation circuit 45 is input to the A-register 46a and to the B-register 46b via the C-latch 53, and the highest order bit (MSB) of the output of the ALU 46 is output to the latch 54. The output of this latch 54 is output to the B-register 46b and to the D-latch 55, and a value intermediate in the minimum value calculation is preserved in the B-register 46b by the ALU 46 and the discrepancy amount x at that time is preserved in the D-latch 55.

Moreover, the maximum value detection circuit 52 has the same configuration as the minimum value detection circuit 51 except for that the logic is inverted and in that the discrepancy amount x is not stored.

The city-block distance H described above is successively calculated while the left picture small region is shifted one pixel at a time with respect to one of the right picture small regions. Each time there is the output of a value for the city-block distance H, the comparison and renewal of the maximum value $H_{MAX}$ and the minimum value $H_{MIN}$ up till that time determines the maximum value $H_{MAX}$ and the minimum value $H_{MIN}$ for the city-block distance H in that small region at substantially the same time as the output of the final city-block distance H.

The discrepancy amount determination section 60 is configured as a RISC processor on a small scale, and is provided with a calculator 61 as the core, two 16-bit width data buses 62a and 62b, a latch 63a which holds the discrepancy amount x, a latch 63b which holds the threshold value $H_a$ as a first specified value a latch 63c which holds the threshold value $H_b$ as a second specified value, a latch 63d which holds the threshold value $H_c$ as a third specified value, two pairs of shift registers 64a and 64b which hold brightness data of a right picture, a switch 65 which receives the output of the calculator 61 and outputs the discrepancy amount x or "0", output buffer memories 66a and 66b which temporarily hold the output results, and a read only memory (ROM) 67 into which the control program for the functions of the calculator 61 and the operation timing of the circuit is written.

The calculator 61 has the ALU 70 as the central unit, and comprises an A-register 71, a B-register 72, an F-register 73 and a selector 74. The A-register 71 is connected to the data bus 62a (hereinafter called the A-bus 62a). The B-register 72 is connected to the data bus 62b (hereinafter called the B-bus 62b). The switch 65 operates by the calculation results of the ALU 70 and either the discrepancy amount x or "0" is stored in the output buffer memories 66a and 66b.

The A-bus 62a are connected to the latches 63b, 63c and 63d which store each of the threshold values $H_a$, $H_b$ and $H_c$, and the maximum value detection circuit 52. The B-bus 62b is connected to the minimum value detection circuit 51. Furthermore, the A-bus 62a and the B-bus 62b are connected to each of the shift registers 64a and 64b.

In addition, the switch circuit 65 is connected to the calculator 61 and also to the minimum value detection circuit 51 via the latch 63a, and the three check conditions to be described later are judged by the calculator 61 and the output to the output buffer memories 66a and 66b is switched in dependency on those judgment results.

The discrepancy amount determination section 60, check whether the minimum value $H_{MIN}$ obtained for the city-block distance H is in actual coincidence with the left and right small regions, and only when this condition is met is the discrepancy amount x output to the output buffer memories 66a and 66b corresponding to the position of the pixel.

More specifically, when the city-block distance H becomes minimum, the discrepancy amount is a required discrepancy amount x. The discrepancy amount x is output when the following three check conditions have been met while no data is used and "0" is output when the conditions are not met.

(1) $H_{MIN} \leq H_2$ (Distance is not detected when $H_{MIN} > H_2$.)

(2) $H_{MAX} - H_{MIN} \geq H_b$ (This is a condition for checking whether the obtained minimum value $H_{MIN}$ is clearly low due to oscillation resulting from noise, and does not check difference with the vicinity of the minimum value $H_{MIN}$, but rather, checks the difference with the maximum value $H_{MAX}$ so that distance detection is performed with respect to objects for such as curved surface for which the brightness changes gradually.)

(3) Brightness difference between adjacent pixels in a lateral direction inside a small region of a right picture $> H_c$ (There is edge detection when the threshold value $H_c$ becomes larger but it is also possible to have handling when the brightness changes gradually, by making the threshold value $H_c$ lower than the normal edge detection level. This condition is based on the fundamental principle that distance detection cannot be performed in the small region which has no change in the brightness, and is performed for each pixel in a small region and so is used only for pixels for which distance has been actually detected for inside a small region, and produces a natural result.)

Moreover, when this discrepancy amount determination processing is performed by software in a normal microprocessor, it is necessary to have a speed of 27 MIPS, and this cannot execute.

The distance distribution information which is the final result output from the discrepancy amount determination section 60 is written via a shared bus 80, to a dual port memory 90 which becomes the interface to external apparatus such as a road and obstruction recognition apparatus.

Figure 4:
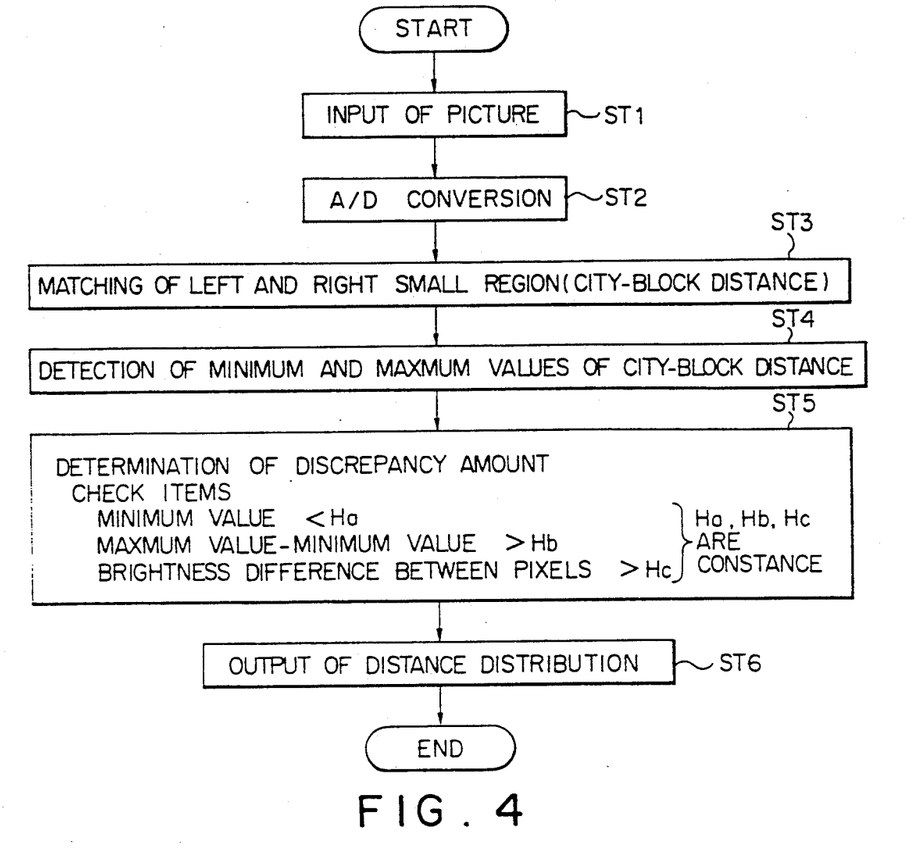
FIG. 4 is a flow chart showing an operation of the distance detecting system.

The following describes the operation of an embodiment, the stereoscopic picture processing apparatus 20 and in accordance with the flowchart shown in FIG. 4.

First, the input of the picture taken by the CCD cameras 11a and 11b in step ST1 undergoes A/D conversion in step ST2 and is then corrected by the LUT 32a and 32b, and is stored in the picture memories 33a and 33b.

The pictures which are stored in the picture memories 33a and 33b is only the scanning lines out of all of the scanning lines of the CCD device of the CCD cameras 11a and 11b and which are necessary for later processing and for example, are stored at the rate of one for every 0.1 second.

Next, when there is proceed to step ST3, the left and right picture data are written four lines at a time from the left and right picture memories 33a and 33b via the shared bus 80 and to the input buffer memories 41a, 41b, 42a and 42b, matching of the read left and right pictures is performed as an evaluation of the coincidence.

When this is done, the operation for read from the picture memories 33a and 33b to the input buffer memories 41a, 41b, 42a and 42b for each picture of left and right, and the operation for write with respect to the shift registers 43a, 43b, 44a and 44b are performed alternately.

For example, with a left picture, while the picture data is being read from the picture memory 33a to one of the input buffer memories 41a, write of the picture data which has been written from the other input buffer memory 41b to the shift register 43b is performed. On the other hand, with a right picture, while picture data is being read from a picture memory 33b to one of the input buffer memories 42a, write of the image data which has been written from the other input buffer memory 42b to the shift register 44b is performed.

Figure 9:
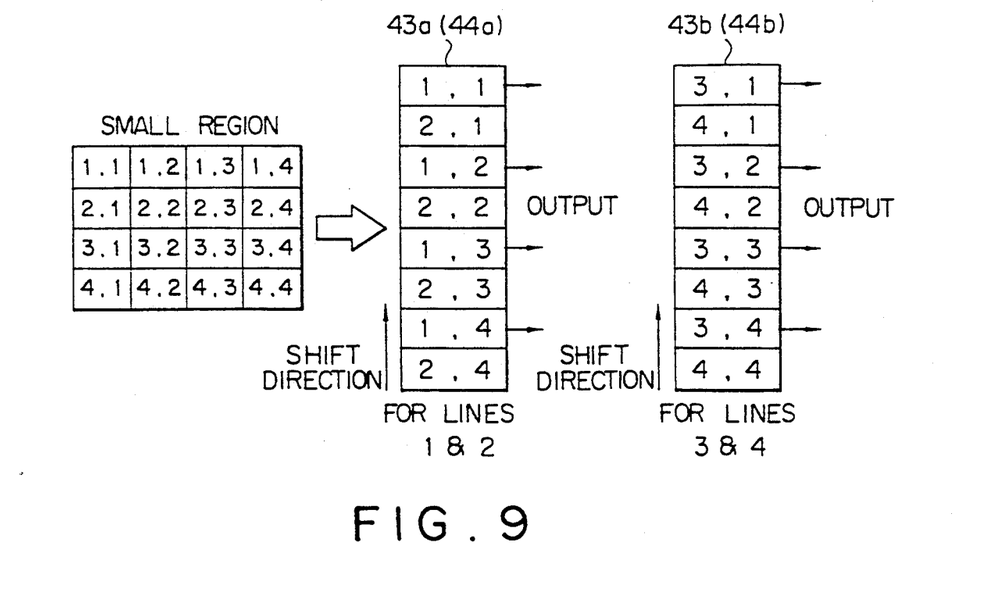
FIG. 9 is an explanatory view showing a storing order in a shift-registor.

Then, as shown in FIG. 9, the shift registers 43a, 43b, 44a and 44b hold the picture data (1,1) ... (4,4) of the small region of 4×4 pixels for left and right, and one of the shift registers 43a (44a) holds data for the first and second lines, the other shift register 43b (44b) holds data of the third and fourth lines, and there is successive and respective input of odd-numbered lines and even-numbered lines.

Each of the shift registers 43a, 43b, 44a and 44b respectively hold independent transfer lines, and data of 4×4 pixels for example, is transferred in eight clocks.

Then, these shift registers 43a, 43b, 44a and 44b output the contents of the even numbered steps of the eight steps to the city-block distance calculation circuit 45 and when the calculation for the city-block distance H starts, the data of the right picture is held in the shift register 44a and 44b, and data of odd-numbered lines and even-numbered lines is alternately output for each clock, data of the left picture continues to be transferred to shift registers 43a, 43b, data of odd-numbered lines and even-numbered lines is alternately output, and data which is displaced in the direction of one pixel to the right is rewritten for each two clocks. This operation is repeated for until a portion of 100 pixels has been displaced (e.g. 200 clocks).

When there is the completion of transfer with respect to one small region, the contents of the right picture address counter (head address of the small region of the next 4×4 pixels) is set in the left picture address counter inside the second address controller 87 and the processing for the next small region is started.

Figure 12:
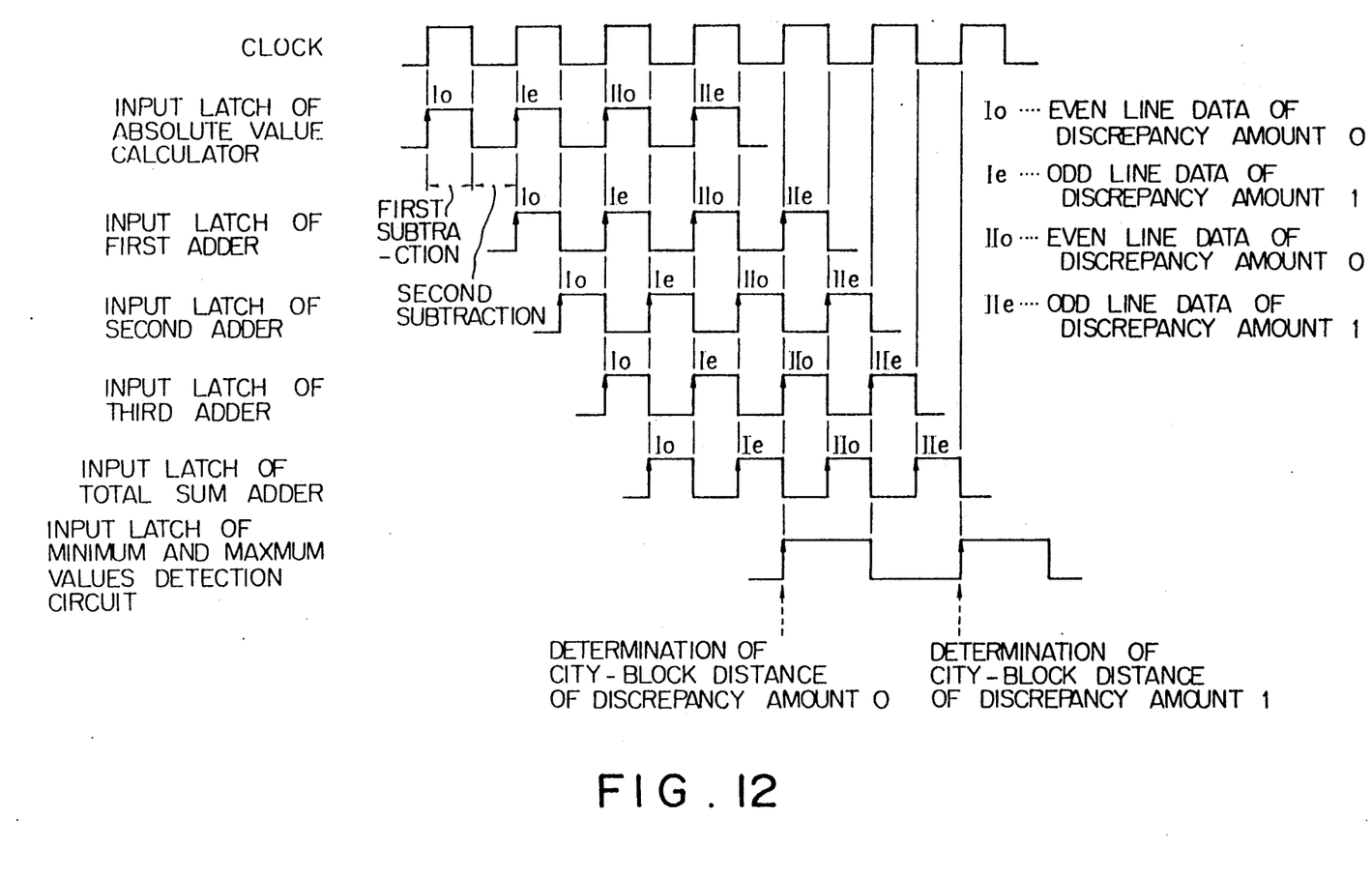
FIG. 12 is a timing chart showing an operation of the city-block distance calculation circuit.

In the city-block distance calculation circuit 45, as shown in timing chart of FIG. 12, the data of 8 pixels portion is first input to the absolute value calculator of the initial stage of the pyramid structure and the absolute value of the brightness difference of the left and right pictures is calculated. More specifically, when the brightness of the corresponding right pixel is subtracted from the brightness of the left pixel and the result is negative, changing the calculation command and again performing subtraction with the subtrahend as the other performs calculation of the absolute value. Accordingly, subtraction is performed twice in the initial stage.

After this, when the initial stage is passed, the first through third adders from the second through fourth stages add the two input data which have been input at the same time and output the result. Then, to total sum of the two continuous data is added in the total sum adder of the final stage and the total sum is added, and the necessary city-block distance H for 16 pixels portion is output to the minimum and maximum value detection portion 50 for each two clocks.

Then, there is proceed to step ST4 and the maximum value $H_{MAX}$ and the minimum value $H_{MIN}$ of the city-block distance H calculated in step ST3 is detected. As has been described, the detection of the maximum value $H_{MAX}$ and the minimum value $H_{MIN}$ are exactly the same other than they use mutually inverted logic and in that the discrepancy amount x is not retained. The following is a description of only the detection of the minimum value $H_{MIN}$.

First, the city-block distance H initially output and for which the discrepancy amount x is "0" is input to the B-register 46b of the ALU 46 via the C-latch 53 of minimum value detection circuit 51 shown in FIG. 1. The city-block distance H (for which the discrepancy amount x is 1) and which is output at the next clock is input to the A-register 46a of the ALU 46 and to the C-latch 53, and the ALU 46 starts the comparison calculation with the B-register 46b at the same time.

If the result of the comparison calculation in the ALU 46 shows that the contents of the A-register 46a are smaller than the contents of the B-register 46b, the contents of the C-latch 53 (that is, the contents of the A-register 46a) are sent to the B-register 46b and the discrepancy amount x at this time is retained in the D-latch 55. With this clock, the city-block distance H (for which the discrepancy amount x=2) is input to the A-register 46a and the C-latch 53 at the same time, and the comparison calculation is started again.

In this manner, the minimum value during calculation is always stored in the B-register 46b and the discrepancy amount x at that time is always retained in the D-latch 55, with calculation continuing until the discrepancy amount x is becomes 100. When the calculation is finished, (i.e. after one clock from the output of the final city-block distance H), the contents of the B-register 46b and the D-latch 55 are read to the discrepancy amount determination portion 60.

During this time, the next small region initial value is read into the city-block distance calculation circuit 45 and so that no time is wasted since four clocks are taken to calculate a single city-block distance H, there is a pipeline structure and a new calculation result is obtained on each two clocks.

In step ST5, when the minimum value $H_{MIN}$ and the maximum value $H_{MAX}$ for the city-block distance H are determined, the discrepancy amount determination section 60 checks the three conditions mentioned above, and the discrepancy amount x is determined.

Figure 13:
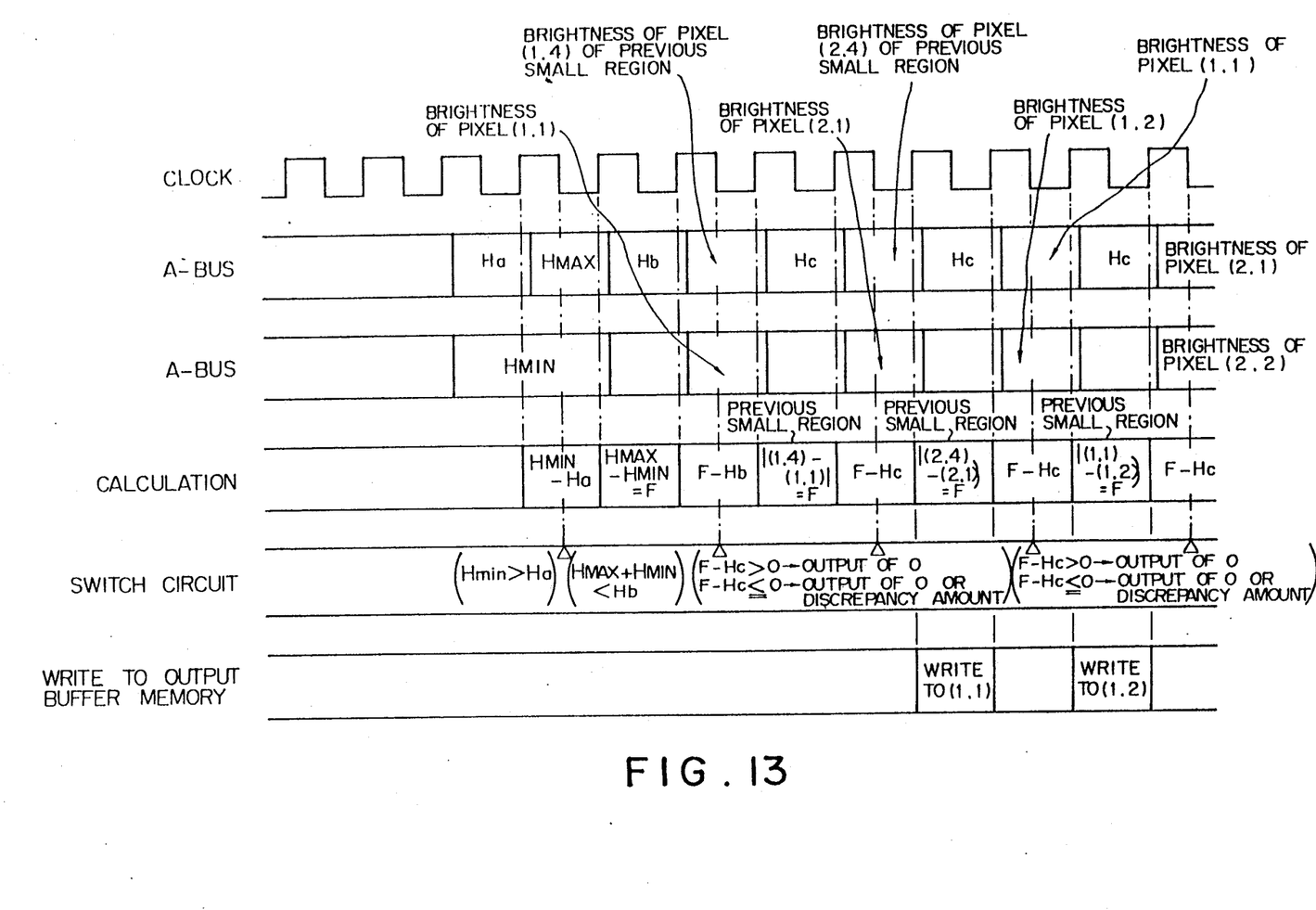
FIG. 13 is a timing chart showing an operation of a discrepancy amount determination circuit.

More specifically, as shown in the timing chart FIG. 13, the minimum value $H_{MIN}$ is latched to the B register 72 of the calculator 61 via the B-bus 62b and the threshold value $H_a$ which is compared with the value in the B-register 72 is latched to the A-register 71 via the A-bus 62a. The minimum value $H_{MIN}$ and the threshold value $H_a$ are compared in the ALU 70 and if the minimum value $H_{MIN}$ is larger than the threshold value $H_a$, then the switch circuit 65 is reset, and 0 is output irrespective of the results of the later checks.

The maximum value $H_{MAX}$ is then latched to the A-register 71, and the difference between the maximum value $H_{MAX}$ and the minimum value $H_{MIN}$ retained in the B-register 72 is calculated, and that result is output to the F-register 73. With the next clock, the switch circuit 65 is reset if the contents of the F-register 73 are smaller than the threshold value $H_b$ latched to the A-register 71.

The calculation of the brightness difference between adjacent pixels starts for the next clock. The two pairs of shift registers 64a and 64b which preserve the brightness data have a ten-stage configuration, and is connected to the latter stage of the shift registers 44a for the first and second lines of the city-block distance calculation section 40 and the shift registers 44b for the second and third lines of the city-block distance calculation section 40. The output of these shift registers is taken from the final stage and from the two stages before and are respectively output to the A-bus 62a and the B-bus 62b.

When the calculation of the brightness difference starts, brightness data of each pixel in the small region is retained in each of the stages of the shift registers 64a and 64b, and first, the brightness data of the first line of the fourth column of the small region before and the brightness data of the first line of the fourth column of the current small region is latched to the A-register 71 and to the B-register 72 of the calculator 61.

Then, the absolute value of the difference between the contents of the A-register 71 and the contents of the B-register 72 is calculated and the results are stored in the F-register 73. The threshold value $H_c$ is then latched to the A-register 71 at the next clock, and compared with the value of the F register.

If the comparison results of the calculator 61 indicate that the contents of the F-register 73 (absolute value of the brightness difference) is larger than the contents of the A-register (threshold value $H_c$), then switch 65 outputs either the discrepancy amount x or "0", or "0" if the contents of the F-register 73 are smaller than the contents of the A-register, and are written to an address representing the first column of the first row of the small region of the output buffer memories 66a and 66b.

While the comparison between the threshold value $H_c$ and the brightness difference between adjacent pixels is being performed in the calculator 61, the shift registers 64a and 64b are shifted one stage. Then, the calculation with respect to the brightness data of the second line of the fourth column of the previous small region and that second line of the fourth column of the current small region starts. In this manner, the calculation with respect to the third line and the fourth line is started and performed in the same manner after the alternate calculation of the first line and the second line of the small region.

During the calculation, the final stage and the initial stage of the shift registers 64a and 64b are connected to become a ring type shift register, and after the calculation of the entire small region and the shift clock has two times added, the contents of the register return to their status prior to calculation, and when the sending of the brightness data of the next small region has ended, the data of the four lines of the current small region are stored in the final stage and the stage before that.

In this manner, while there is the calculation of the discrepancy amount, the next data is prepared in the A-bus 62a and the B-bus 62b, and write of the results is performed so that the one data can be processed by only the two clocks necessary for calculation. As a result, all of the calculations are completed in 43 clocks for example, even when the check of the minimum value $H_{MIN}$ and the maximum value $H_{MAX}$ which are initially performed are included, and there is sufficient allowance for the time necessary to determine the minimum value $H_{MAX}$ and the maximum value $H_{MAX}$ of the city-block distance H with respect to a single small region, and it is also possible to have some additional functions.

Then, when the discrepancy amount x is determined, in step ST6, the discrepancy amount x is output as distance distribution information from the output buffer memories 66a and 66b to the dual port memory 90, and the processing in the stereoscopic picture processing apparatus 20 ends.

These output buffer memories 66a and 66b are the same as the input buffer memories 41a, 41b, 42a and 42b described above in that they have a capacity of a four-line portion, and the distance distribution information is sent from one to the dual port memory 90 while there is write to the other.

The distance distribution information written to the dual port memory 90 enables the calculation of the three-dimensional position in the XYZ space of the object corresponding to each of the pixels, from the optical system parameters such as the focus distance and the mounting position of the CCD cameras 11 and 12, and enables the accurate detection of the distance to an object other tan the automobile and without lowering of the amount of information.

Moreover, the calculation to the three-dimensional position in XYZ space from the distance distribution information and using the discrepancy amount x can be performed by processing inside the stereoscopic picture processing apparatus 20 and the data format for output to external from the stereoscopic picture processing apparatus 20 can be determined in accordance with the external apparatus which are connected.

Figure 14:
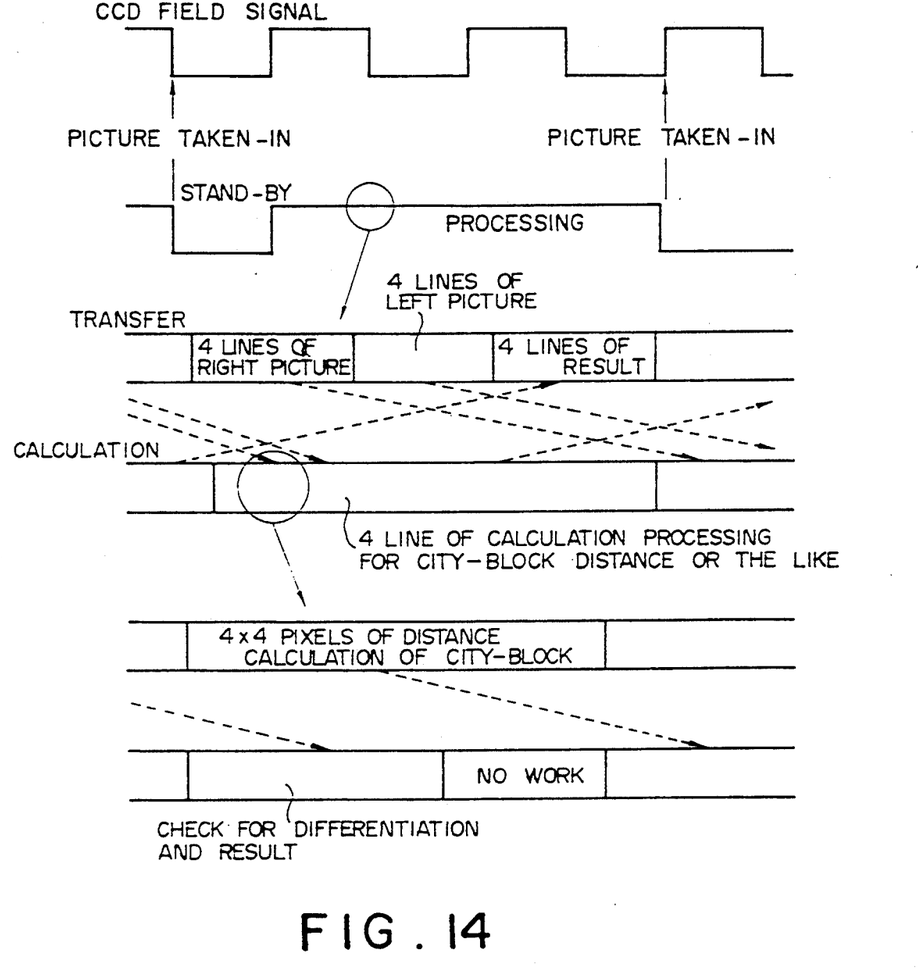
FIG. 14 is a timing chart showing an operation of the entire system.

Finally, the timing of the entire system of the stereoscopic picture processing apparatus 20 is described below with reference to the timing chart shown in FIG. 14.

The field signals from the left and right CCD camera 11a and 11b and which are synchronized with each other, are written to the image memories 33a and 33b for each 0.1 sec. (at the rate of one picture for every three).

Then, the taken-in end signals are received and block transfer starts for each four lines. The block transfer transfers the three blocks of the right picture, left picture and the distance distribution picture of the result in the order.

During this time, the calculation of the discrepancy amount x is performed with respect to one of the input/output buffer memories. Then, in consideration of the calculation time for the discrepancy amount x, there is the start of transfer with respect to the other input/output buffer memory which has been on standby for a required time.

The calculation of the city-block distance H with respect to a small region of 4×4 pixels of one of the right picture is calculated while displacing 100 pixels for the left picture and so is performed 100 times. While there is the calculation of the city-block distance H of one region, the discrepancy amount x of the region before that has its checks completed and is output as a distance distribution.

If the number of lines which have to be processed is 200, then processing for 4 lines has to be repeated 50 times, and the processing time for a four-line portion to transfer the first data when there is the start of calculation, and the processing time for a four-line portion for the transfer of the final results after the end of calculation and to the image recognition section that a processing time for a total of an 8 lines portion is required.

The time from the start of transfer of the first input image line until the end of transfer of the final distance distribution is 0.076 sec. from the results of actual circuit operation.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A distance detection system for an automobile, having an imaging system for imaging external objects in a required range from a plurality of different directions and for obtaining a plurality of pictures corresponding to said different directions, and a picture processing unit for processing said pictures and for outputting a distance distribution in an entire image of said required range, the picture processing unit comprising:
coincidence calculation means for dividing said pictures of said required range into a plurality of small regions and for performing a calculation of the coincidence between each of said plurality of small regions in one of said pictures and at least one region in at least one of the other pictures;
discrepancy amount determination means for determining discrepancy amounts at corresponding small regions over an entire picture on the basis of a maximum value of the degree of coincidence corresponding to said regions.

2. The distance detection system according to claim 1, further comprising:
picture conversion means for converting analog image data taken by said imaging system into digital image data having a required brightness gradation;
maximum and minimum detection means for detecting a minimum value and a maximum value of said degree of coincidence calculated by said coincidence calculation means; and
said coincidence calculation means for performing high-speed calculation of said degree of coincidence at each small region of said digital image data; and
said discrepancy amount determination means for executing a determination of said discrepancy amount when the difference between said maximum value and said minimum value is equal to or greater than a first predetermined value, and when a brightness change of a small region of said required range is larger than a second predetermined value.

3. The distance detection system according to claim 2, wherein:
said picture conversion means is provided with a high-speed image memory for storing the entire image photographed by said imaging system, and said coincidence calculation means is provided with a high-speed buffer memory for taking and storing one portion of said image.

4. The distance detection system according to claim 2, wherein:
said picture conversion means is provided with a data table for correcting an output of said imaging system.

5. The distance detection system according to claim 2, wherein:
said imaging system is provided with two image cameras for short distance having solid state camera elements, and two image cameras for long distance with solid state camera elements.

6. A distance detection system for a vehicle, having first and second cameras provided on said vehicle to image external objects, comprising:
means for dividing images detected by said first and second cameras into a plurality of small regions;
coincidence determining means for determining a degree of coincidence between said images in each of said small regions; and
discrepancy amount determining means responsive to said degree of coincidence for determining a discrepancy amount between said images at each of said small regions, whereby discrepancy amounts over entire images represent a distance distribution in said image.

7. The system according to claim 6, wherein said coincidence determining means comprise:
city-block distance calculating means for calculating a city-block distance for each of said small regions from one of said first and second cameras by comparing with said small regions from the other of said first and second cameras.

8. The system according to claim 7, wherein said coincidence determining means further comprises:
minimum value determining means for determining a minimum value of said city-block distance for each of small regions;
whereby said discrepancy amount determining means detects said discrepancy amounts in response to said minimum value of said city-block distance.

9. The system according to claim 8, wherein said coincidence determining means further comprises:
maximum value detecting means for detecting a maximum value of said city-block distances for each of said small regions;
whereby said determining means detects said discrepancy amount in response to said maximum value of said city-block distances.

10. The system according to claim 9, wherein said coincidence determining means further comprises:
brightness difference detecting means for detecting a brightness deference between adjacent pixels in each of said small regions from either of said first and second cameras;
whereby said discrepancy amount determining means detects said discrepancy amount in response to said brightness difference.

11. The system according to claim 6, wherein said coincidence determining means comprises:
city-block distance calculating means for calculating city-block distance for each of said small regions from one of said first and second cameras by comparing with same of said small regions from the other of said first and second cameras; and
minimum value detecting means for detecting a minimum value of said city-block distance for each of said small regions;
whereby said discrepancy amount determining means picks up each of said determined discrepancy amounts as data of the distance distribution when said minimum value is smaller than a first threshold value, a difference between said maximum value and said minimum value is larger than a second threshold value and said brightness difference is larger than a third threshold value.

12. The system according to claim 7, further comprises:
picture conversion means for converting analog image data detected by said first and second cameras into digital image data of gray scale.

13. The system according to claim 12, wherein said picture conversion means comprises:
A/D converters connected to said first and second cameras respectively to provide said digital image data;
look-up tables connected to said A/D converters, respectively to correct said digital image data so as to extend the contrast thereof, thereby outputting corrected digital image data; and
picture memories connected to said look-up tables respectively to store said corrected digital image data.

14. The system according to claim 13, wherein said city-block distance calculating means comprises:
two groups of input buffer memories, one group being connected to one of said picture memories, the other group being connected to the other of said picture memories, said both input buffer memories being capable of operating in higher speed than said picture memories.

15. The system according to claim 14, further comprising:

a minimum and maximum value determination circuit receiving said output data of said city-block distances for determining a minimum value and maximum value of said city-block distances.

16. The system according to claim 15, further comprising:
a first latch circuit for holding a first threshold value;
a second latch circuit for holding a second threshold value;
a third latch circuit for holding a third threshold value;
a fourth latch circuit for holding a fourth threshold value;
a first register for receiving said maximum value and said first, second and third threshold values respectively store;
a second register for receiving said minimum value to store;
a logic calculation unit for calculating a difference between said maximum value latched by said first register and said minimum value latched by said second register;
a third register for receiving said difference from said logic calculating unit; and
a selector for selectively connecting one of said second and said third registers to said logic calculating unit;
wherein said logic calculation unit compares said first threshold value latched by said first latch circuit and said minimum value stored in said second register and producing a signal representing absent data of said discrepancy available when said minimum value is larger than said first threshold value; and
wherein said logic calculation unit further compares said second threshold value latched by said second latch circuit and said difference stored in said third register and for producing said signal representing absent data of said discrepancy amount available when said difference is smaller than said first threshold value.

17. The system according to claim 6, wherein said first and second cameras are charge coupled device cameras.

18. The system according to claim 6, further comprising:
third and fourth cameras provided to take images at an area close to the vehicle; and
said first and second cameras taking images at an area a distance apart from the vehicle.

19. The system according to claim 6, wherein said small regions included 4 by 4 pixels therein.

20. A distance detecting system for a vehicle comprising:
first image taking means for taking a first optical image in a predetermined area;
second image taking means distanced from a position of said first image taking means for taking a second optical image in said predetermined area;
coincidence calculation means for dividing said first optical image into a plurality of predetermined regions and for calculating a degree of coincidence between said plurality of predetermined regions and regions in said second optical image; and
discrepancy amount determining means for determining a discrepancy amount between a region in said second optical image corresponding to said predetermined region and a region in said second optical image which has a maximum degree of coincidence with said predetermined region and for storing said discrepancy amount into memory means at an address representing said predetermined region.

21. The system according to claim 20, further comprising:
A/D converting means for converting analog data of said first optical image and said second optical image into digital data having gradation according to brightness of said optical image; and
said coincidence calculating means calculating said degree of coincidence in accordance with said gradation as a digital value.

22. The system according to claim 20 wherein said coincidence calculating means comprises:
city-block calculating means for calculating city-block distances based on absolute value of difference between said region in said first optical image and said second optical image.

* * * * *